Patented Dec. 23, 1952

2,623,069

UNITED STATES PATENT OFFICE 2,623,069

METHOD OF PRODUCING 4-CHLOROBUTANE-1-SULFONYL CHLORIDE

John B. Wilkes, Albany, Calif., assignor to California Research Corporation, San Francisco, Calif., a corporation of Delaware No Drawing. Application September 29, 1950, Serial No. 187,693

8 Claims. (Cl. 260—543)

This invention relates to new derivatives of thiophane and a method for making the same.

The term "thiophane" as used in this specification refers to the organic thiocompound which is also known in the art under the name of "tetramethylene sulfide" and "tetrahydrothiophene."

In general, the thiophane ring has been considered to be a stable structure resistant to attack by a number of chemical agents.

I have found, however, that upon reacting thiophane with chlorine and water under the conditions set forth herein, the reaction product mixture, upon settling, separates into two layers or phases: (1) a water-insoluble bottom layer of a new product 4-chlorobutane-1-sulfonyl chloride in high yields of 30 to 65% and higher by weight, based on the initial thiophane material, formed in accordance with the equation

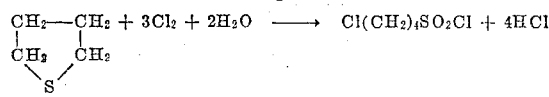

(2) an upper phase containing water, HCl, unreacted thiophane, if any, and water-soluble cyclotetramethylene sulfone formed in accordance with the equation

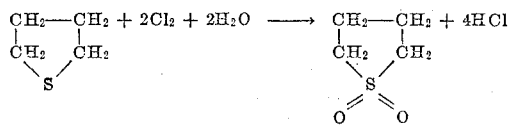

The reaction is carried out by passing chlorine through thiophane dissolved in aqueous acetic acid or in hydrochloric acid; or chlorine may be fed through an aqueous suspension of thiophane formed by stirring or shaking thiophane and water together. In the latter case somewhat lower yields of 4-chlorobutane-1-sulfonyl chloride are obtained. The solution or suspension of thiophane is placed in a turbomixer and chlorine is admitted thereto through an inlet tube at the bottom of the mixer. The termination of the reaction is indicated by the sudden emergence of chlorine from the reactor when absorption of the chlorine by the thiophane material ceases. Usually, the rate of admission of chlorine is immaterial provided the heat of reaction is removed by appropriate cooling means from the reaction zone at a rate sufficient to maintain the reaction temperature in the range from about 20 to about 90° F., and preferably from about 30 to about 70° F. It is important for the successful operation of the reaction and the production of desirable yields of 4-chlorobutane-1-sulfonyl chloride that the molar ratio of chlorine to thiophane be not greater than 3:1 to avoid chlorination of the aliphatic groups in the thiophane material, and that the molar ratio of water to thiophane be greater than about 2.5:1 mols, the preferred ratio being from about 4.5:1 to about 8:1 mols. Under ordinary conditions the reaction is completed in about two hours.

The 4-chlorobutane-1-sulfonyl chloride layer being water-insoluble can be readily separated from the water-soluble layer of the cyclotetramethylene sulfone layer of the reaction product mixture by any suitable method of mechanical separation, e. g., by decantation or with the aid of a separatory funnel. Thereupon it is dried by employing anhydrous $MgSO_4$ or some other appropriate desiccant. Since 4-chlorobutane-1-sulfonyl chloride is susceptible to hydrolysis, becoming completely hydrolyzed if left to stand overnight in saturated hydrochloric acid solution, the separation of this product from the reaction mixture should be made as soon as the reaction is terminated and the product should be well protected from contact with moisture during storage.

The 4-chlorobutane-1-sulfonyl chloride is a colorless to light-yellow liquid which decomposes when heated to 140° C. or a higher temperature, gives off $SO_2$, 1,4-dichlorobutane, and resins.

The operation of my invention will be better understood from the following illustrative examples, Nos. 1, 2 and 3.

Example 1

0.270 mol of thiophane was dissolved in 1.4 mols of acetic acid containing 0.67 mol of water. Chlorine was passed into the solution at 50–65° F. until it was no longer absorbed. Upon adding additional water the reaction mixture separated into two layers, a water-soluble layer of cyclotetramethylene sulfone and a water-insoluble layer of 4-chlorobutane-1-sulfonyl chloride. Upon separation of these two layers the yield of the water-insoluble product was determined to be equal to 40% by weight of the initial thiophane.

Example 2

0.437 mol of thiophane was mixed with dilute hydrochloric acid (0.5 mol of HCl and 7.2 mols of water), so that the ratio of water to thiophane was equal to 16.5. After the reaction of thiophane with chlorine and water in a turbomixer at a temperature which ranged from 50° F. to room temperature, a water-insoluble layer of 4-chlorobutane-1-sulfonyl chloride was recovered from the reaction mixture in a yield which was equal to 65% by weight of the initial thiophane. The aqueous layer contained cyclotetramethylene sulfone (45% by weight based on the thiophane).

Example 3

An aqueous suspension of thiophane in water was prepared, using 2.24 mols of thiophane to 11.4 mols of water. Upon reacting this suspension with chlorine in a turbomixer at a temperature of 50° F., the yield of 4-chlorobutane-1-sulfonyl chloride was found to be equal to 30% by weight of the initial thiophane.

The crude water-insoluble product from Example 1 was subjected to a quick distillation in a small distillation flask and yielded $SO_2$ and a liquid which, in accordance with the results of infrared analysis, contained about 20% of 1,4-dichlorobutane. A portion of this fraction was redistilled, and gave a neutral material with a refractive index of $n_D^{23} = 1.4495$, which confirmed the formation of 1,4-dichlorobutane, and served as a proof of the 4-chlorobutane-1-sulfonyl chloride structure of the product of reaction of thiophane, chlorine, and water.

To secure a further proof of the identity of my new reaction product, I reacted 4-chlorobutane-1-sulfonyl chloride of Example 1 with cyclohexylamine in an ether solution, subsequently extracting the unreacted amine with aqueous hydrochloric acid and removing the ether solvent by evaporation. The sulfonamide thus obtained was recrystallized twice from water and methanol and had a melting point of 70 to 71° C. The analysis of this sulfonamide gave the following values:

|    | Found, Percent | Calculated, Percent |
| --- | --- | --- |
| C  | 47.2 | 47.3 |
| H  | 7.8  | 7.95 |
| Cl | 15.6 | 14.01 |
| S  | 11.9 | 12.65 |
| N  | 5.14 | 5.53 |

These values further confirmed the structure of my new product being $Cl(CH_2)_4SO_2Cl$, a bifunctional compound.

In lieu of thiophane, thiophane sulfoxide may be employed for the reaction with chlorine and water to produce the water-insoluble 4-chlorobutane-1-sulfonyl chloride of my invention as well as water-soluble cyclotetramethylene sulfone. The reaction which is carried out under otherwise the same conditions as those employed with thiophane follows the equation:

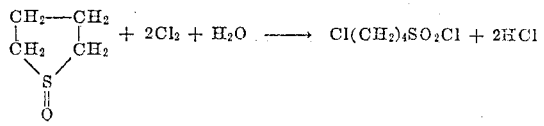

The application of thiophane sulfoxide is illustrated by Example 4.

*Example 4*

0.247 mol of thiophane sulfoxide was dissolved in a dilute solution of hydrochloric acid containing 0.12 mol of HCl to 2 mols of water. After the reaction with chlorine in a turbomixer at a temperature which ranged from 50 to 70° F., a reaction product was obtained; it became separated into two layers, the water-insoluble layer being recovered and identified as 4-chlorobutane-1-sulfonyl chloride in a yield of a 35% by weight based on the initial thiophane.

The 4-chlorobutane-1-sulfonyl chloride of my invention is a valuable chemical intermediate which can be reacted with tertiary amines for the purpose of preparing quaternary germicidal and fungicidal compounds. Additionally, it may be used for the preparation of plasticizers.

I claim:
1. A method for producing 4-chlorobutane-1-sulfonyl chloride which comprises reacting not more than 3 mols of chlorine with one mol of an organic thiocompound selected from the class consisting of thiophane and thiophane sulfoxide in the presence of a molar excess of water and at a temperature from about 20 to about 90° F.
2. A method as defined in claim 1, wherein said thiocompound is dissolved in aqueous acetic acid.
3. A method as defined in claim 1, wherein said thiocompound is dissolved in hydrochloric acid.
4. A method as defined in claim 1, wherein said chlorine is reacted with an aqueous suspension of said thiocompound.
5. A method for producing 4-chlorobutane-1-sulfonyl chloride, which comprises reacting chlorine with an organic thiocompound selected from the class consisting of thiophane and thiophane sulfoxide in the presence of a molar excess of water and at a temperature from about 20 to about 90° F., the mol ratio of said chlorine to said thiocompound being not greater than 3:1 and the mol ratio of water to said thiocompound being at least 2.5:1; recovering a reaction product mixture consisting of a water-insoluble non-aqueous 4-chlorobutane-1-sulfonyl chloride phase and a water-soluble aqueous phase of cyclotetramethylene sulfone; effecting separation of said water-insoluble phase from said water-soluble phase; drying said water-insoluble phase; and recovering therefrom 4-chlorobutane-1-sulfonyl chloride.
6. A method for producing 4-chlorobutane-1-sulfonyl compound, which comprises reacting chlorine with thiophane in the presence of a molar excess of water and at a temperature from 20 to 90° F., the mol ratio of said chlorine to said thiophane being not greater than 3:1 and the mol ratio of water to thiophane being at least 2.5:1; recovering the reaction product mixture consisting of a water-insoluble non-aqueous phase of 4-chlorobutane-1-sulfonyl chloride and a water-soluble aqueous phase of cyclotetramethylene sulfone; effecting the separation of said water-insoluble phase from said water-soluble phase; drying said water-insoluble phase; and recovering therefrom 4-chlorobutane-1-sulfonyl chloride.
7. A method as defined in claim 6, wherein said reaction between thiophane and chlorine is effected at a temperature from about 30 to about 70° F.
8. A method for producing 4-chlorobutane-1-sulfonyl chloride, which comprises reacting an organic thiocompound selected from the class consisting of thiophane and thiophane sulfoxide with chlorine and water, said thiocompound, chlorine and water being in an approximate mol ratio of 1:3:2.

JOHN B. WILKES.

REFERENCES CITED

The following references are of record in the file of this patent:

Helberger et al., Liebigs Annalen Der Chemie, Band 562, Heft 1, pp. 23–35 (1949).

Helberger, Chemical Abstracts, 41, page 4101 (1947).